United States Patent [19]

Hamar

[11] Patent Number: 4,714,344
[45] Date of Patent: Dec. 22, 1987

[54] LASER APPARATUS FOR MONITORING GEOMETRIC ERRORS

[76] Inventor: Martin R. Hamar, 70 Linden Tree Rd., Wilton, Conn. 06897

[21] Appl. No.: 855,898

[22] Filed: Apr. 24, 1986

[51] Int. Cl.$^4$ .................... G01B 11/26; G01C 1/00
[52] U.S. Cl. ............................... 356/152; 356/150
[58] Field of Search .................. 356/152, 400, 150

[56] References Cited

U.S. PATENT DOCUMENTS

| | | | |
|---|---|---|---|
| 3,603,691 | 9/1971 | Hamilton | 356/152 |
| 3,762,820 | 10/1973 | Zoot et al. | 356/152 |
| 3,816,000 | 6/1974 | Fiedler | 356/152 |
| 3,902,810 | 9/1975 | Hamar | . |
| 4,045,129 | 8/1977 | Hamar | . |
| 4,105,339 | 8/1978 | Wirtanen | 356/152 |
| 4,297,031 | 10/1981 | Hamar | . |
| 4,382,680 | 5/1983 | Hamar | . |
| 4,566,202 | 1/1986 | Hamar | . |

FOREIGN PATENT DOCUMENTS 1387172  3/1975  United Kingdom .
2000867  1/1979  United Kingdom .

OTHER PUBLICATIONS

"Machine Alignment Speeded by Laser" by A. W. Young, 8/18/66 *The Iron Age* Hamar Laser Instruments Brochure 1984.
"Laser Alignment in Industry" by Martin R. Hamar *ASTME Technical Paper* 1968.
"Laser Alignment—Current Uses and Applications" by Martin R. Hamar *SME Technical Paper* 1974.

*Primary Examiner*—Stephen C. Buczinski
*Attorney, Agent, or Firm*—Anthony J. Casella; Gerald E. Hespos

[57] ABSTRACT

A laser system is provided for monitoring geometric errors in a machine, measuring apparatus or the like. The laser systems comprises at least one dual laser beam generator and at least one target assembly. The dual laser beam generator is operative to generate first and second tightly focused parallel laser beams. The target assembly comprises first and second targets in line respectively with the first and second laser beams. The targets are operative to sense the precise location at which they are impinged upon by the laser beams. The target assembly further includes a beam splitter that is operative to direct a portion of one laser beam through an angle. A third target is provided in line with the diverted portion of the laser beam. The three targets are operatively connected to a control means which utilizes the data sensed by each target to assess pitch, roll and yaw rotational errors as well as pure displacement errors. A plurality of such systems may all be operatively connected to a single control means.

12 Claims, 6 Drawing Figures

LASER APPARATUS FOR MONITORING GEOMETRIC ERRORS

BACKGROUND OF THE INVENTION

Precisely manufactured machines are available to perform various tooling or manufacturing operations on a workpiece and/or to perform various measurements relative to the workpiece. The machine often will include several members that move relative to the workpiece during the performance of the specified task. At least portions of the machine will be spaced some measurable distance from the workpiece. The machine then may include one or more members that will selectively move into closer proximity to the workpiece or that will move along the workpiece.

Machines that fit the above described general characteristics may be operative to drill, thread, ream, cut or weld a workpiece. Other machines that fit the above described general characteristics are measurement instruments that move relative to the surface of a workpiece to make and record certain measurements that define particular attributes of the workpiece.

As an illustrative example, precise measurement instruments are used in the manufacture of automobiles. More particularly, an early phase in the design of a new automobile model is to produce a full size model of the vehicle. The model will then be analyzed for various aesthetic and engineering characteristics. At some point during this analytical procedure, the precise geometric shape of the model will be recorded to facilitate certain analytical tests, to carry out certain design revisions and to enable various forms to be constructed for use in manufacturing the actual vehicles. One apparatus that is employed to make and record these geometric measurements includes a measuring instrument that moves along one or more rails relative to the model. The measurement instrument includes a probe that follows the contour of the model as the instrument moves along the rail. Movements of the probe are sensed, digitized and stored for subsequent reproduction. After the instrument has completed one longitudinal pass along its rail, the relative height of the instrument may be adjusted a selected amount to enable a second pass relative to the model. This process is continued until the geometric coordinates have been measured for the entire surface of the model.

The above described machining and measuring equipment can be manufactured to achieve extreme precision. However, the actual precision and performance of the machine often depends upon various external factors. For example, the building in which the machine is employed may develop certain sags and shifts that will cause the machine support and the workpiece to move relative to their initial intended positions. In other situations, temperature variations can cause various shifts in the positions of machine or workpiece members relative to one another. In still other situations, gravitational effects on an extended support or arm may cause geometric variations. Another common source of geometric errors results from the inevitable but unintended contact with various machine parts. Such contact can cause a very minor movement in one part of a machine that will be geometrically significant at a location on the machine spaced therefrom.

There are six types of geometric errors that may occur in any of the above described systems. More particularly, the system may exhibit pitch, roll or yaw errors, which define angular variations relative to the three orthogonal axes (X, Y and Z). The machine may also exhibit certain vertical, horizontal or longitudinal displacement errors.

Most of the above described geometric errors can be compensated for if the errors are known. However, the machines themselves generally are unable to identify and measure their own internal geometric errors or errors resulting from shifts in their supporting surfaces. Furthermore, mechanical measurements are imprecise and time consuming.

Laser alignment systems have been developed to facilitate the precise alignment of members relative to one another. These systems generally include a laser source and a target sensitive to the laser source. The target typically is operative to identify the precise point at which it is impinged upon by the laser. The target and/or the laser may also be in communication with a controller which reports and/or records sensed information and which may enable alignment corrections. Examples of alignment systems are shown in: U.S. Pat. Nos. 3,902,810; 4,045,129; 4,297,031; 4,382,680 and 4,566,202, all of which issued to Martin R. Hamar, the applicant herein. The disclosures of the prior patents are incorporated herein by reference. Also of relevance is applicant's copending application Ser. No. 636,835 filed Aug. 1, 1984, the disclosure of which is incorporated herein by reference. Although all of the above described laser alignment devices and systems are extremely effective, none of the systems are capable of effectively assessing all or most of the six possible geometric errors described above.

Accordingly, it is an object of the subject invention to provide an apparatus for accurately measuring geometric errors.

It is another object of the subject invention to provide an apparatus for simultaneously measuring a plurality of different types of geometric errors.

It is an additional object of the subject invention to provide an apparatus that can be readily incorporated into a machine to continuously measure a plurality of possible geometric errors.

Another object of the subject invention is to provide a laser system for assessing a plurality of geometric errors in a machine tool or coordinate measureing machine.

SUMMARY OF THE INVENTION

The subject invention is directed to an alignment apparatus or system for detecting geometric errors. The alignment apparatus or system can be employed with any of a variety of machine tools, measurement instruments and such.

The alignment system of the subject invention comprises a plurality of position sensitive targets which are sensitive to a beam of light, and means for generating a plurality of beams of light. Preferably the system includes at least three targets and at least three beams of light. It also is preferred that the light be laser light generated from one or more laser sources. Each laser source is adapted to produce a tightly focused laser beam. Preferably each laser source comprises a solid state diode lasing element which is operative to provide a resolution of 0.001 inches at a distance of approximately 50 feet. The various laser sources are fixedly mounted at a known distance away from one another. The precise spacing between the laser sources is dependent upon the particular machine with which the alignment system is used.

The laser alignment system further includes a plurality of laser sensitive position targets. Each target is operative to identify the precise location at which it is impinged upon by the narrowly focused laser beam. Examples of such targets are the Model T-216 and Model T-218 Targets manufactured by Hamar Laser Instruments, Inc. of Georgetown, Conn. The targets are mounted in fixed and known relationship to one another. Preferably, the targets are in communication with a readout means and a control means. The readout means and/or control means may be operative to produce a signal that defines the specific location at which the target is impinged upon by a laser beam. The control means may also be operative to perform various calculations, as explained herein, based on the combined readings of the targets. More particularly, the signals generated by the targets can be compared with one another and with known values to precisely determine geometric errors that may exist in or between the members to which the laser sources and laser targets are mounted.

One embodiment of the subject invention comprises a pair of laser sources mounted to a machine or the like at a fixed and known distance from one another. The laser sources are operative to direct their respective laser beams substantially parallel to one another. This embodiment of the laser alignment system further includes first and second laser targets aligned respectively to be impinged upon by the first and second laser sources. The first and second laser targets are fixedly mounted to either the same machine as the laser sources or to a related machine or workpiece. The precise distance between the laser sources and the laser targets need not be fixed, and in fact may be moved relative to one another. However, the laser targets must be fixedly mounted at a known distance from one another.

The coordinates sensed by the targets can be used to determine the precise location of the laser sources relative to some known frame of reference. By knowing the fixed geometric relationship between the respective laser source and a machine tool, measuring probe or the like, geometric errors of the machine tool, probe or the like can be accurately determined. More particularly, differences in X, Y coordinate readings of a particular target specifically identify the corresponding X, Y coordinate displacements. Similarly, differences in sensed locations between the first and second target can be compared to known values and through known trigonometric relationships can be analyzed to determine the amount of roll or relative twisting that has taken place between the first and second laser beams.

The above described embodiment may further include a laser beam splitter between the first laser source and the first laser target. The beam splitter is operative to divert a portion of the first laser beam 90° away from its initial alignment. A third laser target then is disposed to be impinged upon by this diverted portion of the first laser beam. The third target acts as a virtual target. More particularly, even though the third target is aligned at 90° to the initial direction of the laser beam, it behaves mathematically and trigonometrically as if it were directly behind the first target and in line with the first laser beam. Consequently, differences in the Y-axis readings of the first and third targets can be used with the known distances between the beam splitter and the targets to trigonometrically calculate pitch errors, or angular variations of the first laser beam relative to the vertical alignment. Similarly, differences between the horizontal coordinates measured by the first and third targets can be employed trigonometrically to measure yaw errors or angular variations of the first laser beam through a horizontal plane.

The above described embodiment of the subject laser system is operative to determine errors in pitch, roll and yaw, as well as vertical and horizontal displacements. Thus, errors in five of the six possible degrees of freedom can be accurately assessed by the subject system. Knowing these five errors, a precise measurement along the sixth degree of freedom, or the longitudinal direction, can be accurately measured by known mechanical means or electronic laser means.

In certain embodiments of the subject invention, a plurality of the above described laser systems will be used, with each such system comprising first and second laser sources, first through third laser targets and a beam splitter. Each of these subsystems may be used along a portion of a machine on which errors may be likely. The results from each such subsystem will be measured and analyzed by a common control means which will be operative to enable precise corrections to the operative members of the machine being monitored.

DETAILED DESCRIPTION OF THE PREFERRED EMBODIMENT

Figure 1:
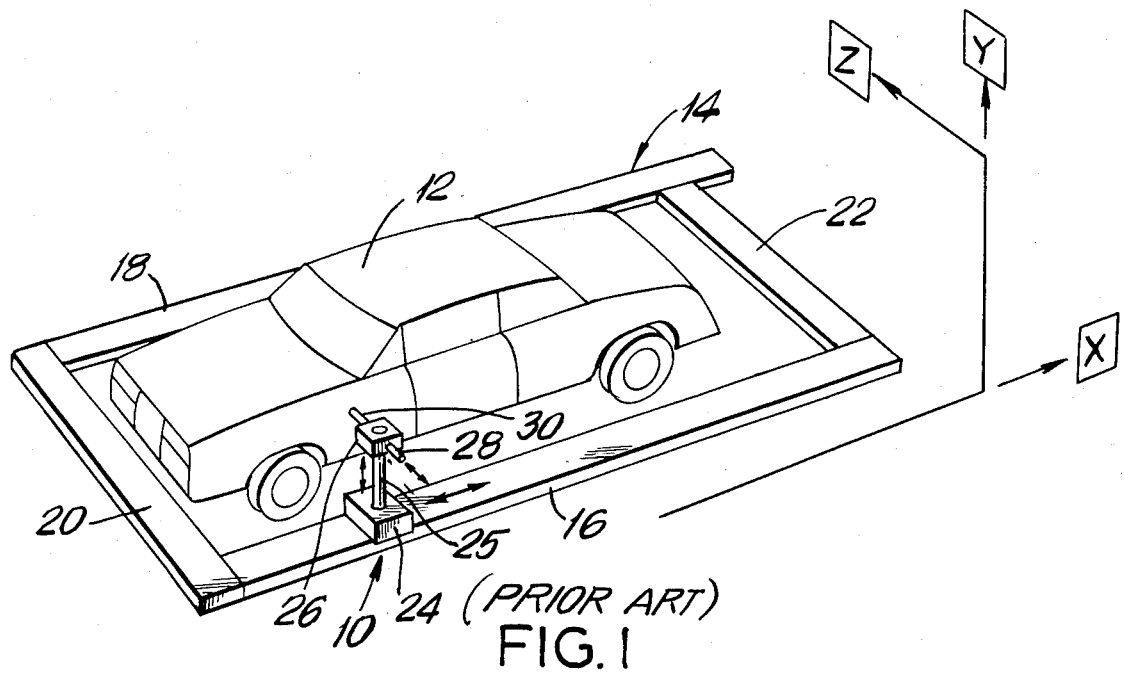
FIG. 1 shows a perspective view of a prior art coordinate measurement apparatus.

FIG. 1 illustrates a prior art coordinate measurement system which is typical of the many machines with which the laser system of the subject invention may be employed. This prior art coordinate measurement system is indicated generally by the numeral 10 in FIG. 1, and may be employed to measure the precise shape of an object such as the scale model of an automobile 12. The coordinate measurement system 10 includes an array of rails 14 which include straight rail sections 16 and 18 extending parallel to one another along opposed sides of the model 12 and straight rail sections 20 and 22 extending parallel to one another along the respective front and rear ends of the model 12 and generally perpendicular to rail sections 16 and 18. As shown in FIG. 1, the model 12 is disposed within the rectangular area defined by the array of rails 14.

The prior art coordinate measuring system 10 further includes a base 24 which is movably mounted on the rail 10 and which also is adapted for movable mounting on rails 18, 20 and 22. The base 24 includes a motor which enables the controlled movement along the appropriate rail 16–22. Column 26 extends vertically upward from the base 24, and a head 26 is slidably mounted for vertical movement along column 24. Probe 28 is mounted to head 26 for slidable movement therein toward and away from the model 12. The probe 28 is biased toward the model 12 such that the end 30 of probe 28 will remain in contact with the model 12.

The prior art coordinate measuring system 10 is operative to provide detailed X-Y-Z coordinates which define the shape of the model 12. In this context, the respective X, Y and Z axes are illustrated and labeled in FIG. 1. These coordinates are developed by setting the head 26 at a predetermined height relative to column 25. This predetermined height corresponds to a specific Y-axis coordinate. The base 24 then is moved along rail 16, or in the direction of the X-axis. Throughout this movement of the base 24, the end 30 of the probe 28 will follow the contour of the model 12. More particularly, the probe 28 will move in a Z-axis direction in accordance with the changes in the contour of the model. The relative position of the probe 28 at various locations of the base 24 along rail 16 effectively define both Z-axis and X-axis coordinates. Additionally, the preset height of the head 26 defines a Y-axis coordinate that remains constant throughout one movement of the base 24 along the rail 16. Thus, during a complete pass of the base 24 along the rail 16, a complete array of X and Z coordinates will be developed for a selected Y-axis coordinate. After one such complete pass along rail 16, head 26 will be repositioned on column 25, and base 24 will make another pass along rail 16 compiling additional X and Z coordinates corresponding to a new Y-axis measurement. This process continues along the entire array of rails 14 until a complete array of X-Y-Z coordinates is developed for the entire model 12.

The prior art coordinate measuring system 10 shown in FIG. 1 is capable of performing very precise measurements. For example, measurements to an accuracy of 0.0005 in./ft. are possible with the coordinate measuring system 10. Similar accuracies are possible with other measurement systems and with various machine tools. Despite this great potential precision, various geometric errors are possible in the system. For example, natural settling or shifting of the building in which the system 10 is mounted may cause the end of the system 10 near rail 20 to become lower in a Y-axis direction relative to the end of system 10 near rail 22. This may cause a tilting in rails 16 and 18 from one end to the other. Tilting of this type is referred to as a pitch error. Similarly, structural shifts or inadvertent contact with the array of rails 14 could cause the rails 16 and 18 to become nonperpendicular to the rails 20 and 22. Thus, for example, rail 16 may lie in its initial X-axis/Z-axis plane but with a different angular alignment. An error of this type is referred to as a yaw error. Still another geometric error may keep rail 16 in exactly the same X-axis location but with a rotational twist along its length. This is called a roll error and would have increasingly greater effect at higher elevations along the column 25. These errors may occur in more than one rail and in various combinations with one another. Furthermore, the errors may be compounded by local displacements anywhere along any of the rails. Additionally, the column 25 may undergo its own pitch, roll, yaw, or displacement errors relative to the base 24. Still other errors are possible along the length of the probe 28. These errors may compound each other or partially offset one another. In either event, the existence of several independent geometric errors makes correction of those errors extremely difficult. For example an attempt to correct compound errors by adjusting a single member of the system generally will not work, and can make matters worse.

Figure 2:
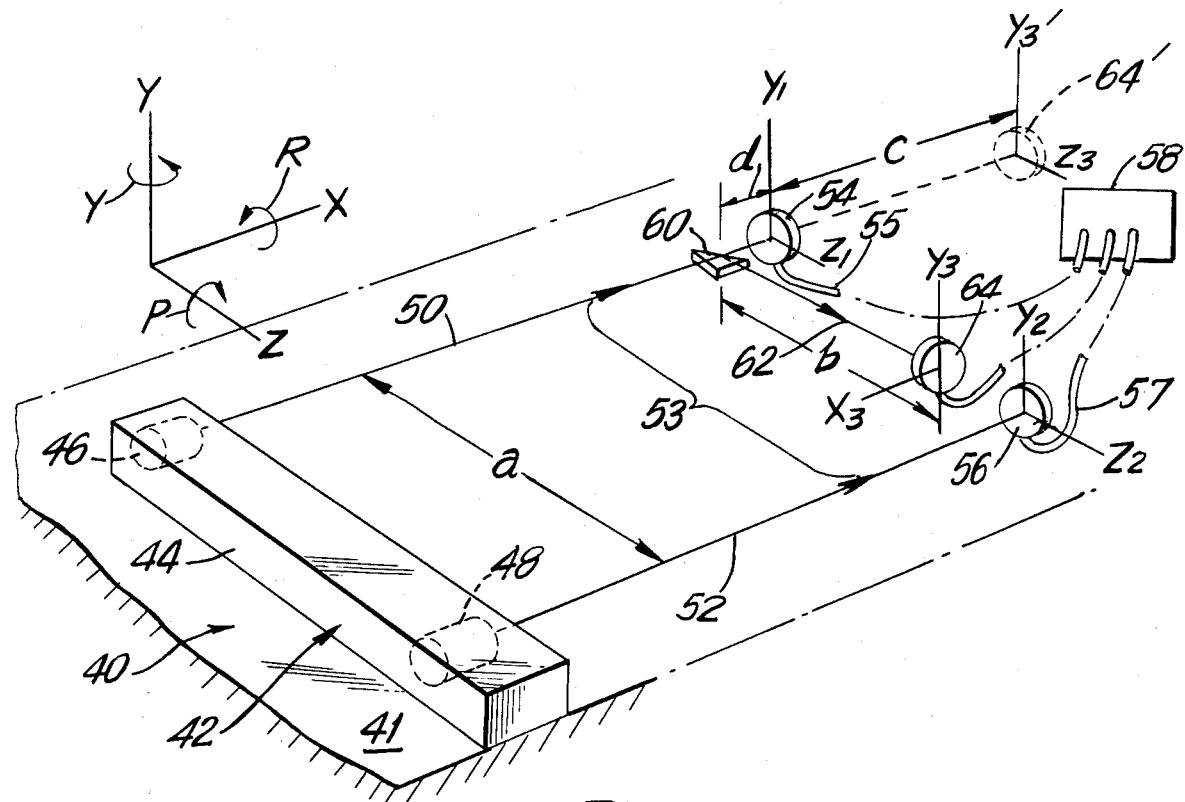
FIG. 2 is a schematic illustration in perspective of the subject laser system for monitoring geometric errors.

The laser geometry monitoring system of the subject invention is indicated generally by the numeral 40 in FIG. 2, and is shown mounted to a machine 41. The laser system 40 comprises a dual laser beam generator 42 which in turn comprises a support frame 44 and first and second lasing elements 46 and 48. The frame 44 is securely mounted to machine 41. The first and second lasing elements 46 and 48 preferably are solid state diode lasing elements which are operative to produce tightly focused first and second laser beams 50 and 52 respectively. The first and second lasing elements 46 and 48 preferably are operative to provide substantially collimated beams. It is preferred that the lasing wavelength be approximately 600-900 nm. The first and second lasing elements 46 and 48 are rigidly mounted to the frame 44 such that the first and second laser beams 50 and 52 are parallel to one another and spaced apart by a distance "a" at any location along the respective laser beams 50 and 52. The spacing "a" between the first and second laser beams 50 and 52 is selected in accordance with the size and geometric configuration of the machine 41 with which the laser system 40 is used.

The laser system 40 further includes a target assembly 53 securely mounted to the machine 41. The target assembly 53 comprises first and second electronic targets 54 and 56 disposed respectively in line with the first and second laser beams 50 and 52. The first and second targets 54 and 56 are operative to identify the precise location of the respective points at which they are impinged upon by the first and second laser beams 50 and 52 respectively. The first and second targets 54 and 56 may be similar to the Model T-216 Target manufactured by Hamar Laser Instruments, Inc., and described in applicant's prior U.S. Pat. No. 4,483,618, which issued on Nov. 20, 1984. The first and second targets 54 and 56 are connected by wires 55 and 57 respectively to a controller 58 which is operative to read the location data sensed by the first and second targets 54 and 56 and to perform appropriate mathematical and/or trigonometric calculations, as explained further below, based on that sensed data.

The target assembly 53 of laser system 40 further includes a beam splitter 60 which is disposed intermediate the first lasing element 46 and first target 54, and in line with the first laser beam 50. The beam splitter 60 is operative to allow a portion of the first laser beam 50 to pass there-through and impinge upon the first target 54. However, the beam splitter 60 also is operative to divert a portion of the first laser beam 50 in a direction perpendicular to the first laser beam 50. This diverted portion of first laser beam 50 is identified by the numeral 62 in FIG. 2.

The target assembly 53 of laser system 40 further includes a third target 64 which is fixedly mounted to be in line with the diverted laser beam 62 and which is spaced from the beam splitter 60 by distance "b". The third target 64 is considered a virtual target. More particularly, even though the third target 64 is offset from the first laser beam 50, for mathematical or trigonometric purposes, the third target 64 is effectively disposed in line with the first laser beam 50 and disposed a distance beyond the beam splitter 60 equal to dimension "b". This virtual location of the third target 64 is shown in dashed lines in FIG. 2 and is identified by the numeral 64'. To achieve the maximum effectiveness from the target 64', the distance "c" between the first target 54 and the virtual target 64' should be a major proportion of the distance "b" between the beam splitter 60 and the target 64'. Stated differently, the distance "d" between the beam splitter 60 and the first target 54 is small.

In use, the dual laser beam generator 42 will be fixedly mounted to one location on the machine 41 being analyzed, while the target assembly 53 is securely mounted to a different location on the machine 42. The initial mounting of the laser system 40 to the machine 41 must be precise such that the Z-axis and Y-axis relationships, as shown in FIG. 2, of the various components are precisely known. The X-axis distance between the dual laser beam generator 42 and the targets 54, 56 and 64 need not be precisely known, and in fact may vary during the operation of the machine 41. After this initial and precise mounting of the laser system 40 to the machine 41, the readings of the targets 54, 56 and 64 can be continuously or periodically monitored to calculate, assess and correct geometric errors that may develop during the operation of the machine, as explained further below.

To properly explain the error monitoring capabilities of the system 40, it is necessary to first establish a proper frame of reference and to identify the various geometric errors in the context of that frame of reference. For these purposes, X, Y and Z-axes are illustrated in FIG. 2. Briefly, the X-axis extends parallel to the first and second laser beams 50 and 52. The Y-axis extends perpendicular to the plane defined by the parallel first and second laser beams 50 and 52. The Z-axis, of course, is perpendicular to the X and Y-axes, and therefore lies in the plane defined by the first and second laser beams 50 and 52.

The Y-axis shown in FIG. 2 will be defined as the yaw axis, such that rotation of the machine about the Y-axis, as indicated by arrow "y" in FIG. 2 will create a yaw error. This yaw error will of course move the X and Z-axes out of their initial position. The importance of this yaw error will depend upon the amount of the yaw twisting and the initial geometry of the machine. The X-axis is defined as the roll axis, and rotational movement about the X-axis, as indicated by arrow "R" in FIG. 2, will define a roll error. Roll errors will cause the Y and Z-axes to move out of their initial positions. Finally, the Z-axis is defined as the pitch axis and rotational movements about the Z-axis, as indicated by arrow "P" in FIG. 2 define a pitch error. Pitch errors will cause the X and Y-axes to move out of their initial position.

Any of the above described geometric errors that may exist in the machine 41 can be readily calculated by controller 58 by using the outputs from the first through third targets 54, 56 and 64. These calculations are explained herein based on the assumption that the laser system 40 and the machine 41 were initially installed and calibrated such that under a zero geometric error condition, each target 54, 56 and 64 would be impinged upon by the corresponding laser beams at their respective centers. With that simplifying assumption, the sine of the pitch angle is calculated by the equation: $(Y3-Y1)/c$. More particularly, the sine of the pitch angle is calculated by taking the difference between the Y-axis readings of the first and third targets 54 and 64 and dividing that difference by the virtual distance "c" between the first target 54 and the virtual target 64'. Any quotient other than zero will indicate the existence of a pitch error. The sign of the quotient will identify the relative direction of rotation about the Z-axis.

The sine of the roll angle can be calculated by the equation $(Y1-Y2)/a$. More particularly, the sine of the roll angle is determined by subtracting the Y-axis readings of the first and second targets 54 and 56 and dividing that difference by the distance "a" between the first and second laser beams 50 and 52. Once again, a quotient or sine other than zero indicates the existence of a roll error, while the sign of the quotient indicates the direction of rotation about the X-axis.

The sine of the yaw angle is calculated by the equation $(X3-Z1)/c$. Thus, the Z-axis reading of the first target 54 is subtracted from the X-axis reading of the third target 64, and that quotient is divided by the virtual distance "c". In this context, it will be recalled that the third target 64 is mathematically the equivalent of the virtual target 64' shown in FIG. 2. As a result, the X-axis measurement sensed by the third target 64 is the equivalent of a Z-axis measurement on the virtual target 64'. Once again, a quotient or sine other than zero indicates the existence of a yaw error, while the sign of the quotient identifies the direction of rotation about the Y-axis.

In addition to the above described monitoring of rotational errors, the laser system 42 also is operative to sense displacement errors. More particularly, displacement errors in the Y direction are merely sensed by the Y-axis measurement of the first target 54. Similarly, displacement measurements in the Z-axis direction merely are determined by the Z-axis reading of the first target 54. Conceivably, displacement errors could exist without the existence of rotational errors. The X-axis position can be measured precisely by mechanical means.

As noted above, the controller 58 is operative to calculate the rotational errors (pitch, roll and yaw) and the displacement errors. The controller 58 may then use these calculated error data to effect corrections or to develop and report correction factors applicable either to the location of the laser generator 42 or the target assembly 53 or to a location spaced therefrom.

Figure 3:
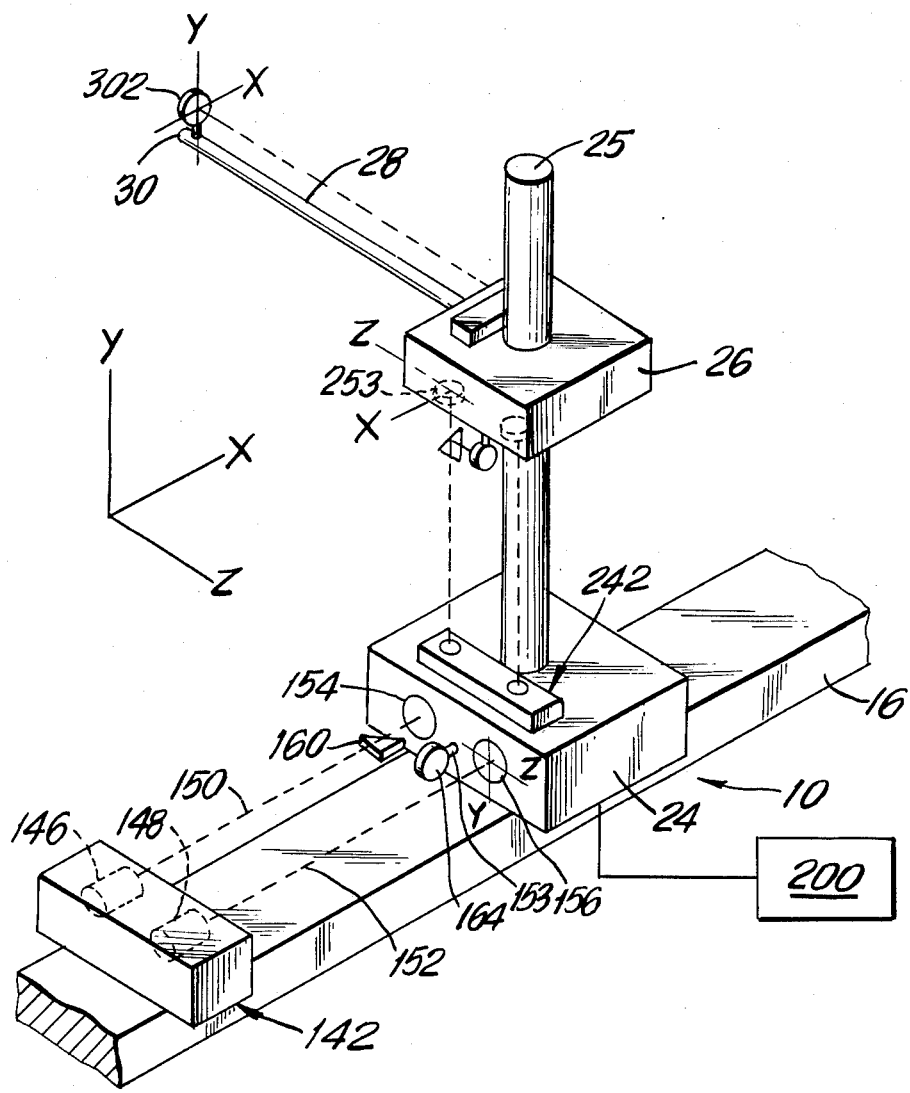
FIG. 3 is a perspective view of a coordinate measuring apparatus adapted with the laser system of the subject invention.

FIG. 1 illustrates a prior art coordinate measuring machine as an example of a machine in which complex geometric errors could occur. FIG. 3 illustrates how the laser system of the subject invention can be incorporated into such a complex machine. More particularly, applying the numerals similar to those used in FIG. 1, the coordinate measuring system 110 comprises a base 124 movably mounted on a rail 116. A column 125 extends orthogonally from the base 124 and perpendicular to the rail 116. A head 126 is movably mounted on the column 125. Finally, an arm 128 is movably mounted relative to the head 125 and includes a probe end 130. The operation of this coordinate measuring system 110 is substantially as described above. To provide a proper frame of reference, FIG. 3 also shows X, Y and Z-axes such that the rail 116 is aligned parallel to the X-axis, the column 125 is aligned parallel to the Y-axis, while the arm 128 is aligned parallel to the Z-axis.

This coordinate measuring system 110 has been modified in accordance with the subject invention to include a laser monitoring system 140. The laser system 140 includes a dual laser beam generator 142 which comprises lasing elements 146 and 148. Alternatively, a single laser beam generator may be employed with suitable beam splitter optics to achieve two parallel laser beams. The dual laser beam generator 142 preferably is mounted at one extreme end of the rail 116. The lasing elements 146 and 148 are operative to generate parallel laser beams 150 and 152. A laser target assembly 153 is mounted to the base 124 and includes first and second laser targets 154 and 156 which are mounted in line with the first and second laser beams 150 and 152. Additionally, a beam splitter 160 is disposed in the path of the first laser beam 150 to divert a portion of the first laser beam 150 ninety degrees to a third target 164. The first, second and third targets 154, 156 and 164 and the beam splitter 160 are securely mounted to the base 124, and preferably are incorporated into the base 124.

Figure 4A:
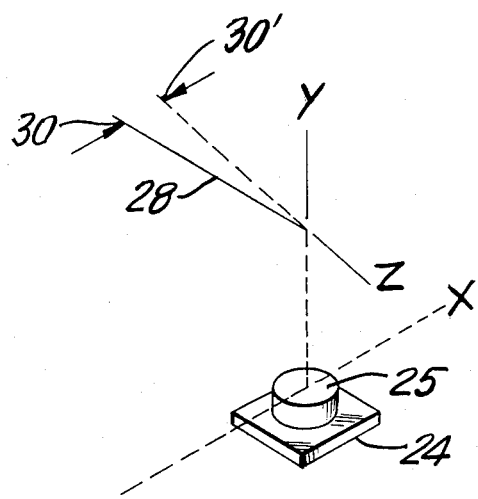
FIGS. 4A–4C are schematic illustrations of the various angular errors that are calculated by the system of the subject invention.

The laser system shown in FIG. 3, comprising the dual laser beam generator 142 and the laser target assembly 153, is operative in exactly the same manner as the laser system 140 described above. More particularly, pitch, roll and yaw rotational errors and Y-axis or Z-axis displacement errors along rail 116 can readily be measured by this system. The X-axis position along rail 116 can be determined automatically and mechanically. As noted previously, the various laser targets used throughout the system preferably have a resolution of 0.0001 inches. Therefore, this aspect of the system is operative to detect extremely small variations in geometry along rail 116. However, it must be emphasized that these very small variations can be manifested as significant errors at probe 130. This effect is illustrated best with reference to FIGS. 4a, 4b and 4c. In particular, FIG. 4a shows the effect of a yaw error in base 124 on the probe 130. The proper location of probe 130 is indicated by 130' along the Z-axis. It is seen from FIG. 4a that even a small yaw error can produce a substantial X-axis displacement of probe 130 and a smaller Z-axis displacement as well. The magnitude of this X-axis error is equal to the sine of the yaw angle multiplied by the Z-axis extension of the arm 128. Similarly, the Z-axis effect of a yaw error is a function of the cosine of the yaw angle and the extension of the arm 128. Thus, if arm 128 and column 125 are long, the error at probe 130 will be substantial for even a small yaw angle error.

Figure 4B:
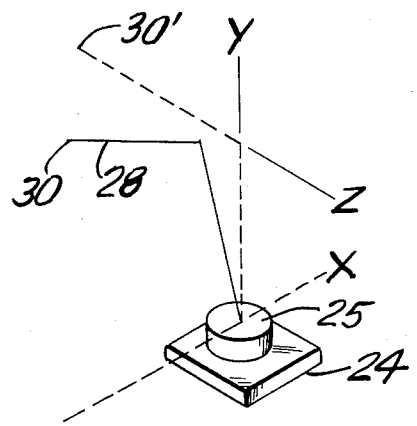
Figure 4C:
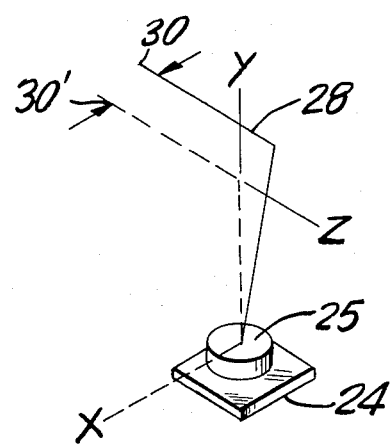

In a similar manner, FIG. 4b shows that a roll error can cause a significant Y-axis displacement error of probe 130 and a smaller Z-axis displacement of probe 130. Again, the actual displacements of probe 130 become a function of the roll angle plus the extension of arm 128. Greater extensions cause greater errors. Finally, FIG. 4c shows that pitch errors result in a substantial X-axis error and a small Y-axis error as well.

Returning to FIG. 3, the effect of geometric errors in rail 116 or in base 124 can be readily calculated and compensated for by the portion of the laser system 140 described thus far. However, geometric errors may also take place in the column 125 or in the mounting of the head 126 on column 125. These geometric errors also could cause substantial errors at probe 130. To account for errors of this type, a second dual laser beam generator 242 is mounted to the base 124, and a second target assembly 253 is mounted to the head 126. The second dual laser beam generator 242 and the second target assembly 253 are structurally comparable to and operate in exactly the same manner as the laser system illustrated in FIG. 2. Thus, pitch, roll and yaw errors in the column 125 relative to the base 124 can be monitored and compensated for.

Finally, geometric errors may occur in arm 128 independent of errors elsewhere in the system 110. For example, arm 128 may bend as a result of gravitational forces. In this situation, however, the effect of these geometric errors in arm 128 can be accurately monitored with a single laser source 300 and a single target 302.

The laser system illustrated in FIG. 3 further includes a control means 200 which is operative to receive the signals from the various laser targets and to perform the above described trigonometric calculations to indicate the effect of each geometric error on the position of probe 130. Conceivably, certain geometric errors in one part of the system will be partially offset by errors elsewhere. However, the simple calculations described above will enable a "netting" of all combined errors. Controller 200 may either carry out corrections or report correction factor to be carried out by other means.

In summary, a laser system is provided for assessing geometric errors in a machine. The system comprises at least one dual laser beam generator and at least one laser sensitive target assembly. The dual laser beam generator is operative to produce two parallel laser beams. The target assembly includes a pair of targets in line with the two laser beams. Each target is operative to sense the precise location at which it is impinged upon by the laser beam. The target assembly further includes a beam splitter which is operative to direct a portion of one of the laser beams at an angle, preferably 90°, away from its principal direction. A third target then is provided in line with this diverted laser beam. The three targets are in communication with a control means which is operative to perform the appropriate mathematical or trigonometric calculations for assessing pitch, roll and yaw rotational errors as well as displacement errors. Several systems comprising laser beam generators and target assemblies may be coordinated with one another.

The subject invention has been described with respect to a preferred embodiment. However, it is apparent that various changes can be made without departing from the scope of the invention as defined by the appended claims. In particular, the invention is applicable for use with a wide range of machines tools and measuring systems in which geometric errors are likely. The invention is not limited to use with the coordinate measuring system described as an example.

What is claimed is:

1. A laser system for monitoring geometric errors, said system comprising:
   a first lasing element operative to produce a first laser beam;
   a second lasing element operative to produce a second laser beam such that the first and second laser beams are parallel;
   a first target generally in line with the first laser beam and operative to produce a signal identifying the point of impingement of the first laser beam thereon;
   a second target generally in line with the second laser beam and operative to produce a signal defining the point of impingement of the second laser beam thereon;
   a beam splitter disposed intermediate said first lasing element and said first target, said beam splitter being operative to permit a portion of the first laser beam to pass therethrough and impinge upon the first target and further being operative to divert a portion of the first laser beam therefrom;
   a third target in line with the diverted portion of the first laser beam and operative to produce a signal defining the point of impingement thereon by the diverted portion of the first laser beam, the beam splitter and the first, second and third targets being fixedly mounted relative to one another with the distances of the beam splitter to the first and third targets respectively being unequal, such that the signals produced by the third target are identical to signals that would be produced by a target disposed along the portion of the first laser beam passing through the beam splitter but at a location spaced from the first target; and control means operatively connected to the first, second and third targets, said control means being operative to receive the signals from the first, second and third targets and to calculate the geometric errors based on the received signals.

2. A laser system as in claim 1 wherein the first and second lasing elements are fixedly mounted to a frame.

3. A laser system as in claim 1 wherein the beam splitter is operative to divert a portion of the first laser beam through a right angle.

4. A laser system as in claim 1 wherein the distance between the third target and the beam splitter is greater than the distance between the first target and the beam splitter.

5. A laser system as in claim 4 wherein the distance between the first and second laser beams is greater than the distance between the third target and the beam splitter.

6. A laser system as in claim 1 wherein said first and second lasing elements comprise solid state diode lasing elements.

7. A laser system as in claim 6 wherein the first and second lasing elements are operative to produce substantially collimated laser beams.

8. A laser system as in claim 1 wherein the first and second lasing elements are mounted to a first location on a machine and wherein the first, second and third targets and the beam splitter are mounted to a second location on a machine.

9. A laser system as in claim 1 wherein the first, second and third targets are electric targets and wherein the signals produced thereby are electric signals.

10. A laser system for monitoring geometric errors in a machine, said laser system comprising a plurality of subsystems, each said subsystem comprising:

a dual laser beam generator operative to produce first and second parallel laser beams; and a target assembly comprising first and second electric targets generally in line respectively with the first and second laser beams and operative to produce electric signals defining the respective points of impingement thereon by the first and second laser beams, a beam splitter disposed between the dual laser beam generator and the first target and operative to divert a portion of the first laser beam from the first target, and a third electric target in line with the diverted portion of the first laser beam and operative to produce an electric signal defining the point of impingement of the diverted portion of the first laser beam thereon, the beam splitter and the first, second and third targets being fixedly mounted relative to one another, with the distances of the beam splitter to the first and third targets respectively being unequal such that the signals produced by the third target are identical to signals that would be produced if the third target were in line with the first laser beam but at a location spaced from the first target;

said laser assembly further comprising a control means in communication with the electric targets of each said subsystem, said control means being operative to receive the signals produced by each said electric target in each said subsystem and being operative to calculate geometric errors based on said sensed signals.

11. A laser system as in claim 10 wherein the beam splitter in each said subsystem is operative to divert a portion of a laser beam directed into said beam splitter through an angle of 90°.

12. A laser system for monitoring geometric errors in a machine, said laser system comprising:

a dual laser beam generator operative to produce first and second parallel laser beams; and a target assembly comprising first and second electric targets generally in line respectively with the first and second laser beams and operative to produce electric signals defining the respective points of impingement thereon by the first and second laser beams, a beam splitter disposed between the dual laser beam generator and the first target and operative to divert a portion of the first laser beam from the first target, and a third electric target in line with the diverted portion of the first laser beam and operative to produce an electric signal defining the point of impingement of the diverted portion of the first laser beam thereon, the beam splitter and the first, second and third targets being fixedly mounted relative to one another with the distances of the beam splitter to the first and third targets respectively being unequal such that the signals produced by the third target are identical to signals that would be produced if the third target were in line with the first laser beam but at a location spaced from the first target, whereby the signals produced by the first, second and third electric targets can be used to monitor rotational and displacement geometric errors between the dual laser beam generator and the target assembly.

* * * * *